US012624573B2

(12) United States Patent
Hörberg et al.

(10) Patent No.: US 12,624,573 B2
(45) **Date of Patent: *May 12, 2026**

(54) ELECTROMECHANICAL LOCK ASSEMBLY

(71) Applicant: Swedlock AB, Halmstad (SE)

(72) Inventors: Johan Hörberg, Halmstad (SE); Martin Lindvall, Simlångsdalen (SE); Magnus Nilsson, Laholm (SE)

(73) Assignee: SWEDLOCK AB, Halmstad (SE)

( * ) Notice: Subject to any disclaimer, the term of this patent is extended or adjusted under 35 U.S.C. 154(b) by 268 days.

This patent is subject to a terminal disclaimer.

(21) Appl. No.: 18/553,116

(22) PCT Filed: Apr. 1, 2021

(86) PCT No.: PCT/SE2021/050298
§ 371 (c)(1),
(2) Date: Sep. 28, 2023

(87) PCT Pub. No.: WO2022/211689
PCT Pub. Date: Oct. 6, 2022

(65) Prior Publication Data

US 2024/0175294 A1 May 30, 2024

(51) Int. Cl.
*E05B 47/00* (2006.01)
*E05B 47/06* (2006.01)
*G07C 9/00* (2020.01)

(52) U.S. Cl.
CPC ........ *E05B 47/0006* (2013.01); *E05B 47/063* (2013.01); *E05B 47/0653* (2013.01);
(Continued)

(58) Field of Classification Search
CPC ............. E05B 47/0006; E05B 47/0653; E05B 47/0611; E05B 47/0626; E05B 47/063;
(Continued)

(56) References Cited

U.S. PATENT DOCUMENTS 12,037,814 B2 * 7/2024 Hörberg ............. G07C 9/00944
2013/0014552 A1 * 1/2013 Bench ................. E05B 47/0673
70/393

(Continued)

FOREIGN PATENT DOCUMENTS

DE 3602989 A1 11/1987
DE 102005041974 A1 12/2006

(Continued)

OTHER PUBLICATIONS

International Search Report and Written Opinion mailed Mar. 1, 2022, issued in corresponding International Patent Application No. PCT/SE2021/050298, filed Apr. 1, 2021, 11 pages.

(Continued)

*Primary Examiner* — Christine M Mills
*Assistant Examiner* — Yahya Sidky
(74) *Attorney, Agent, or Firm* — Christensen O'Connor Johnson Kindness PLLC

(57) ABSTRACT

The present invention relates to an electromechanical lock assembly (1;2) comprising a lock body (15;115), a lock core (17;117), a lock bolt operating member (19;119), and an electronic access control device. The electromechanical lock assembly further comprises an annular element (27;127) which is rotatably and axially displaceably mounted on said lock core (17;117), a coupling device (25;125) arranged to communicate with said electronic access control device and, upon the insertion of an appropriate key (65) in the key receptacle (37), rotationally lock the annular element (27; 127) to the lock core (17;117), thereby enabling rotation of the lock core (17;117) in a first direction and thereby enabling unlocking of said lock (3) with said appropriate key (65), and a blocking arrangement (63) arranged to prevent unauthorized unlocking of said lock (3).

23 Claims, 11 Drawing Sheets

(52) U.S. Cl.
CPC .................... *G07C 9/00944* (2013.01); *G07C 2009/00642* (2013.01)

(58) Field of Classification Search
CPC ............. E05B 47/0638; E05B 47/0646; E05B 47/0649; E05B 27/0042; E05B 35/001; E05B 35/007; E05B 2047/0063; E05B 2047/0084; E05B 2047/0085; E05B 33/00; E05B 19/0052
See application file for complete search history.

(56) References Cited

U.S. PATENT DOCUMENTS

| | | | | |
|---|---|---|---|---|
| 2013/0024552 | A1 | 1/2013 | Bench et al. | |
| 2019/0218826 | A1 | 7/2019 | Allen et al. | |
| 2020/0318392 | A1 * | 10/2020 | Barnett, III | E05B 47/0012 |

FOREIGN PATENT DOCUMENTS

| | | | | |
|---|---|---|---|---|
| DE | 102006012196 | B3 | 8/2007 | |
| EP | 0243586 | A2 | 11/1987 | |
| EP | 1148189 | A1 | 10/2001 | |
| EP | 1531216 | A2 | 5/2005 | |
| EP | 1960622 | B1 | 8/2008 | |
| EP | 2441906 | A2 | 4/2012 | |
| JP | 4035224 | A | 9/1999 | |
| JP | 11264267 | A | 9/1999 | |
| KR | 20080002594 | U | 7/2008 | |
| WO | WO-2004057137 | A1 * | 7/2004 | E05B 47/0649 |
| WO | 2018075605 | A1 | 4/2018 | |

OTHER PUBLICATIONS

Extended European Search Report mailed Aug. 29, 2023, issued in corresponding EP Application No. 2087124, filed Oct. 1, 2020, 5 pages.

* cited by examiner

ELECTROMECHANICAL LOCK ASSEMBLY

TECHNICAL FIELD

The present invention relates to an electromechanical lock assembly, which is configured to be powered by insertion of a programmable key in a key receptacle, said lock assembly comprising a lock body, a lock core located at least partially within the lock body and selectively rotatable with respect to the lock body, the lock core including a key receptacle for receiving a programmable key, a lock bolt operating member rotationally secured to the lock core and configured to move a lock bolt of a lock for locking and unlocking said lock, and an electronic access control device.

BACKGROUND

EP 1 960 622 B2 shows an electromechanical locking system that comprises a lock core, a tailpiece and an electrically operated clutch mechanism for rotatably coupling the tailpiece to the lock core. Further, the lock core includes a keyway for a key having an electrical power source and electrical connection means which provides an electrical connection with the electrical power source of the key.

However, this electromechanical locking system is considered to be complex, which render it cumbersome to manufacture, assemble and use with different kind of lock sets.

SUMMARY OF THE INVENTION

An object of the present invention is to at least partly overcome the above-mentioned drawbacks and to provide an improved electromechanical lock assembly.

According to a first aspect of the invention, this and other objects are achieved, in full or at least partly, by an electromechanical lock assembly, which is configured to be powered upon insertion of a programmable key in a key receptacle, said lock assembly comprising a lock body, a lock core extending along an axial direction, the lock core being located at least partially within the lock body and selectively rotatable with respect to the lock body along the axial direction, the lock core including a key receptacle for receiving a programmable key, a lock bolt operating member rotationally secured to the lock core and configured to move a lock bolt of a lock for locking and unlocking said lock, and an electronic access control device, wherein the lock assembly further comprises an annular element which is rotatably and axially displaceably mounted on said lock core, a coupling device arranged to communicate with said electronic access control device and, upon the insertion of an appropriate key in the key receptacle, rotationally lock the annular element to the lock core, thereby enabling rotation of the lock core and thereby enabling locking and unlocking of said lock with said appropriate key, and a blocking arrangement comprising a retaining device arranged to prevent said annular element from rotating together with said lock core when the lock core is rotated with an inappropriate key, an engagement portion arranged to rotate with the lock core, one contact surface situated on the engagement portion, one contact surface situated on said annular element and a stationary blocking member, wherein said contact surfaces being configured to, upon rotation of said lock core relative to said annular element, axially move said annular element into engagement with said stationary blocking member, thereby blocking further rotation of the lock core and thereby prevent unauthorized locking and unlocking of said lock.

Upon the insertion of an appropriate key, the coupling device thus couples the annular element to the lock core, which prevents the lock core from rotating together relative to the annular element and thereby enables locking and unlocking rotation of the lock core. The coupling device thus serves to enable locking and unlocking rotation of the lock core and the lock operating member which is arranged to rotate together with the lock core. The annular element is maintained in a non-blocking position as long as an appropriate key is inserted in the key receptacle. The lock core is formed as an integral part and the lock bolt operating member is never disengaged from the lock core. In this solution there is thus no need to rotationally couple separate parts of a lock core. This enables a simple solution having few parts and that is easy to manufacture and assemble. Also, it provides for a solution that can be used together with different types of lock sets in an easy manner. Furthermore, this solution allows the use of an electrical actuator to be minimized, thereby providing a power efficient solution.

If the lock core is rotated using an inappropriate key, the annular element is moved into a blocking position, in which it engages each of the lock core and the stationary blocking member. Then, the annular element, blocks further rotation of the lock core. In this manner, the blocking arrangement blocks unauthorized locking and unlocking rotation of the lock core, and consequently unauthorized locking and unlocking of an associated lock, in a robust and reliable manner. Hence, the blocking arrangement may provide a robust and reliable solution.

Hence, especially in view of EP 1 960 622, a less complex solution having fewer parts may be achieved. Furthermore, a solution in which the lock core and lock operating member rotate instantly when using an appropriate key is achieved. Also, a solution in which the lock core cannot be rotated more than just a few degrees with an inappropriate key, is provided.

Furthermore, the electromechanical lock assembly may require the need of an electrical actuator during a relatively short period of time. This has the advantage that the electromechanical lock assembly requires a reduced amount of electrical power to operate.

The electromechanical lock assembly may be configured to be powered by the programmable key when the programmable key has reached an activation position within the key receptacle.

The activation position of the programmable key may be a position where a major portion of a key blade the programmable key is inserted in the key receptacle.

The coupling device may comprise a coupling member arranged to be linearly movable along a direction being transverse to the axial direction of the lock core.

This may prevent unauthorizedly locking the annular element relative to the lock core, thereby increasing security.

The term "transverse" should here be construed broadly, i.e. not only encompassing a strict 90-degree perpendicular angle. The skilled person realizes that a deviation from a strict 90-degree angle works equally well to rotationally lock the annular element to the lock core. Preferably, the coupling member is linearly movable along a direction being in a span of between −30 and +30 degrees from a direction being essentially perpendicular to the axial extension of the lock core. More preferably, the span is between −20 and +20 degrees, and even more preferably the span is between −10 and +10 degrees.

The coupling member may form part of an electric actuator of the coupling device, wherein said electric actuator is arranged to move the coupling member from a rest position, in which the coupling member allows the lock core to rotate relative to the annular element, to a coupling position in which the coupling member rotationally locks said annular element to said lock core.

The coupling device may thus comprise an electric actuator, such as e.g. a solenoid, having a coupling member being movable between a rest position, in which the movable member is situated when the electric actuator is powerless, and a coupling position, in which the coupling member is situated when the electric actuator is powered and in which it rotationally locks the annular element to the lock core.

The annular element may be movable between a non-blocking position, to which said annular element is biased by a biasing member, and a blocking position.

As an alternative to the linearly moveable coupling member, a pivotably movable coupling member may be used. In other words, the coupling member may be pivotable or rotatable between said rest position and said coupling position. In this embodiment a coupling member in the form of a pivotable arm or a rotatable disc may thus be used.

The coupling member may comprise a locking portion arranged to be received in a geometrically complementary portion of the annular element.

This allows rotationally and axially locking the annular element relative to the lock core, thereby allowing locking and unlocking the lock.

The coupling member may further comprise a coupling member solenoid, and the lock core may further comprise a permanent magnet.

The lock core may further comprise an impulse dampening arrangement arranged to dampen a movement of the coupling member upon exposing the electromechanical lock assembly to an impulse.

The term "impulse" should here be construed as a mechanical impulse. Such a mechanical impulse is understood as being a sudden acceleration of the electromechanical lock assembly, either by a direct mechanical engagement by a foreign object on a part of the lock or an indirect intervention, e.g. by means of acoustic waves or any other means of achieving a mechanical movement of the lock or parts thereof, which movement could make the coupling member start to move relative to the lock core. The impulse dampening arrangement is configured to prevent such a mechanical impulse. The impulse may be isolated in time, i.e. include one pulse only, or could be a part of two or more impulses, i.e. a pulse train. A particularly important kind of such a pulse train is one which has been tuned to a natural frequency, or eigenfrequency, of the mechanical system. The impulse arrangement is therefore particularly configured to protect from such pulse trains.

The coupling member is powered by the programmable key. Hence, the coupling member may engage the annular element by magnetic attraction, i.e., substantially frictionlessly, which may extend the lifetime of the coupling member compared to other coupling solutions possibly involving parts in contact that mutually move.

The impulse dampening arrangement may comprise circuitry having an electromotive voltage generating function configured to generate an electromotive voltage in response to a voltage induced by a relative movement between the coupling member and the permanent magnet, thereby generating a magnetic force between the coupling member solenoid and the elongated permanent magnet counteracting a movement of the coupling member relative to the lock core.

One way to achieve such a circuitry having an electromotive voltage generating function is by short-circuiting the coupling member solenoid and just use the naturally occurring electromotive force induced in the same during movement. In other words, said circuitry having an electromotive voltage generating function may be defined by a closed loop including the coupling member solenoid and electrical connections short-circuiting the same.

The impulse dampening arrangement may hence dampen a movement of the coupling member caused by a mechanical impulse on the electromechanical lock assembly.

The impulse dampening arrangement may further comprise a pivotable arm arranged to be pivoted relative to the lock core upon exposing the electromechanical lock to an impulse such that the pivotable arm upon the impulse blocks a movement of the coupling member relative to the lock core.

The pivotable arm forms part of an arrangement having similar mass as the coupling member and is biased by a biasing member similar to a biasing member of the coupling member. Hence, upon a mechanical impulse of the electromechanical lock assembly, the pivotable arm may move simultaneously with the coupling member such that an end portion of the pivotable arm blocks the coupling member to move to such an extent that the annular element becomes rotationally and axially locked, thereby preventing unauthorized unlocking of the lock. The pivotable arm may thereby provide further security against unauthorized attempts to unlock the lock.

The electric actuator may be a solenoid, which has the advantage of an electromechanical lock assembly with very low power consumption may be achieved.

The retainer device may comprise a retaining member which is received in a recess formed in the annular element, which may provide a robust and reliable solution.

The retaining member is a ball and preferably a spring biased ball.

The recess may be an axial groove extending in the axial direction.

The electromechanical lock assembly may further comprise an axial movement limiting device arranged to limit axial movement of the annular element relative to the lock core. The axial movement limiting device thus maintains the annular element rotationally coupled to the lock core. This allows for an assembly with even less power consumption, since the electrical actuator need to be powered only in the initial phase of the rotation of the lock core, i.e. during a relatively short period of time when rotation of the lock core relative to the annular element is initiated. The axial movement limiting device is thus arranged to maintain the annular element in a non-blocking position.

The axial movement limiting device may comprise at least one ball received in an annular groove formed in the annular element, which provides for a robust and reliable solution.

The lock body may be cylindrical.

The stationary blocking member may be located in between a front face of the key receptacle and the annular element along the axial direction such that said contact surfaces are configured to, upon rotation of said lock core relative to said annular element, axially move said annular element in a direction towards the front face of the key receptacle to move into engagement with said stationary blocking member.

This axially ordered arrangement of the parts may simplify assembling the electromechanical lock assembly.

The stationary blocking member may be annularly shaped and arranged circumferentially around the lock core such that the lock core is freely rotatable in respect thereto.

This may simplify assembling of the electromechanical lock assembly.

The engagement portion may form a part of the lock core. The engagement portion may e.g. be an integral part of the lock core, or being a separate element secured to the lock core e.g. by welding, soldering or the like. As an alternative, the engagement portion may form a part of another element of the electromechanical lock assembly. In other words, the electromechanical lock assembly may further comprise a connecting element which is rotationally secured to the lock core and to the lock bolt operating member, and wherein said engagement portion forms a part of said connecting element.

The connecting element may be secured to the lock core by means of a break pin which is arranged to break upon a relative force applied between the lock core and the connecting element exceeding a threshold force.

Hence, upon rotating the lock core with an inappropriate key, the contact surfaces between the connecting element and the annular element enforces the connecting element and the annular element axially away from each other in the axial direction, as the annular element in such a situation is engaged with the stationary blocking member. If the inappropriate key still is continued to be rotated by a torque exceeding a threshold torque, the break pin may break due to exertion of an axially directed shear force. If the break pin break, the lock core becomes freely rotatable while the lock is maintained locked. This may further enhance security of the electromechanical lock assembly.

The connecting element may, further, be rotationally secured to the lock core by means of a locking arrangement which is arranged to rotationally secure the lock core to the connecting element in an absence of an axial movement of said annular element into engagement with said stationary blocking member, and to rotationally unsecure the connecting element from the lock core upon a rotation of the lock core relative to the annular element when the annular element is in engagement with the stationary blocking member.

The locking arrangement may comprise a protruding relief mated with a complementary cavity. The protruding relief may be located on the lock core and the complementary cavity may be located on the connecting element. A main surface of the protruding relief is aligned transverse to the axial direction. This may prevent an unnecessary fatigue or accidental breaking of the break pin, should an appropriate key be rotated with a too large torque. The locking arrangement is thereby arranged to withstand significant torques/forces compared to the break pin. The locking arrangement may thereby leave the break pin substantially unexposed to forces upon rotation with an appropriate key.

Further advantages and characteristics of the invention will emerge from the description below, and from the appended patent claims.

BRIEF DESCRIPTION OF THE DRAWINGS

The invention will be described in more detail with reference to the appended schematic drawings, which show examples of presently preferred embodiments of the invention.

DESCRIPTION OF PREFERRED EMBODIMENTS

Figure 1:
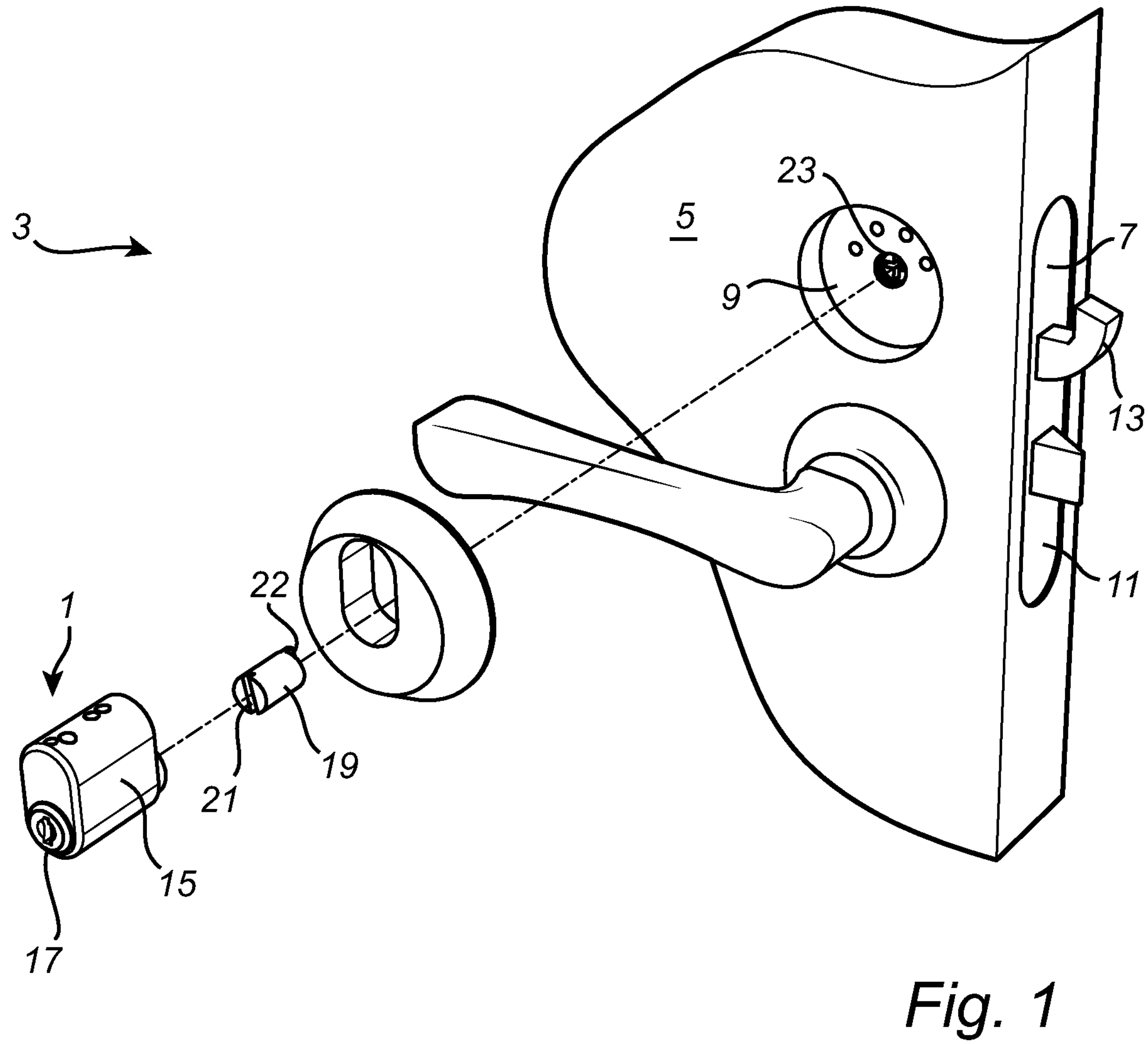
FIG. 1 is an exploded view showing an electromechanical lock assembly according to a first embodiment of the invention.

The invention will now for the purpose of exemplification be described in more detail by means of examples and with reference to the accompanying drawings, in which currently preferred embodiments of the invention are shown. The present invention may, however, be embodied in many different forms and should not be construed as limited to the embodiments set forth herein; rather, these embodiments are provided for thoroughness and completeness, and to fully convey the scope of the invention to the skilled addressee. Like reference characters refer to like elements throughout.

The description in connection with FIGS. 1-4 aims to describe a first example embodiment of the invention. This embodiment may occasionally be referred to as the first example below.

FIG. 1 illustrates an electromechanical lock assembly, in the form of an electromechanical lock cylinder 1, according to a first embodiment of the invention that forms part of an electromechanical lock 3 arranged at a door 5.

The electromechanical lock cylinder 1 is connected to an existing locking mechanism 7 of the electromechanical lock 3. The door 5 may be a front door to a building such as a house or to an apartment. The electromechanical lock cylinder 1 is arranged in connection with a first bore 9 on the exterior side of the door 5 and an interior locking device (not shown), like a knob, on the interior side of the door 5.

As in a common door, having a door lock, a lock housing 11 holding the locking mechanism 7 is arranged in a cavity of the door 5. The locking mechanism 7 and the lock housing 11 are of common sort, which are well known in the art, and not described in detail here. The locking mechanism 7 may be of any kind known in the art which is arranged in a lock housing in a cavity of a door 5. As is also well known in the art, the locking mechanism 3 cooperates, via a lock bolt 13 with a striking plate (not shown) arranged in a door frame (not shown) to lock the door 5. The locking mechanism 7 controls the lock bolt 13 via the electromechanical lock cylinder 1 from the exterior side of the door 5 and via the interior locking device from the interior side of the door 5 in a well-known manner. The locking mechanism 7 is coupled to the lock bolt 13 by a conventional coupling means (not shown) to actuate the lock bolt 13.

The electromechanical lock cylinder 1 comprises a lock body, in the form of a cylinder body 15, a lock core 17 located within the cylinder body 15 and a lock bolt operating member 19. The lock core 17 is selectively rotatable with respect to the cylinder body 15. A fixing device is arranged to prevent the lock core 17 from being retracted from the cylinder body 13. This fixing device may comprise balls (not shown) partly received in an annular groove (not shown) formed in the cylinder body 13 and partly received in an annular groove 18 formed in the lock core 17. The lock bolt operating member 19 is rotationally secured to the lock core 13. To this end the lock operating member 19 is provided with a recess 21 configured to receive a projecting portion (not shown) of the lock core 17. The lock bolt operating member 19 is thus arranged to rotate together with the lock core 17. The lock bolt operating member 19 is configured to operate the lock bolt 13 of the locking mechanism 7 for locking and unlocking the lock 3. To this end, the lock bolt operating member 19 has a projecting portion 22 which is arranged to be received in a recess 23 of the locking mechanism 7.

Figure 2:
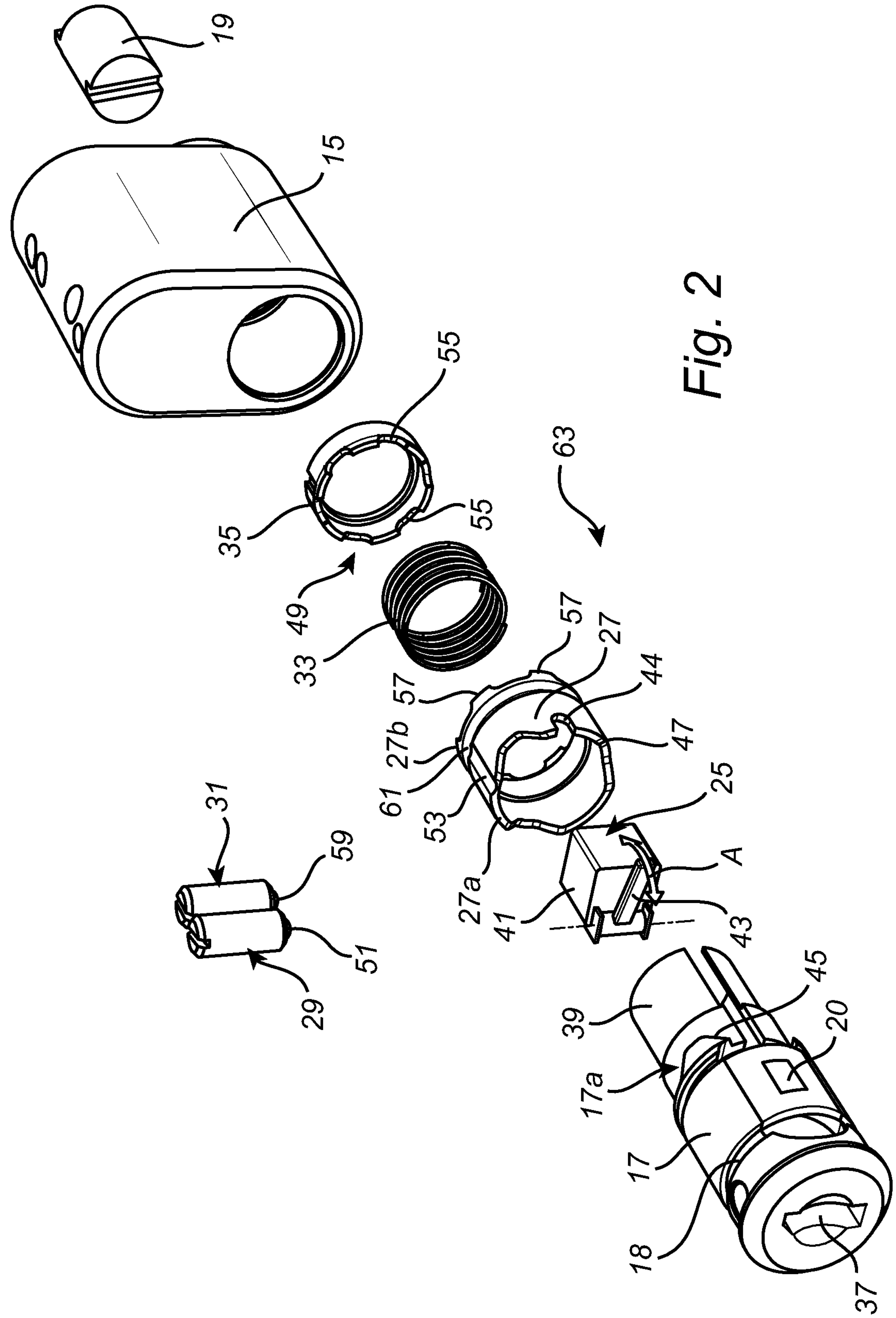
FIG. 2 is an exploded view showing parts of the electromechanical lock assembly shown in FIG. 1.

Now referring to FIG. 2, the electromechanical lock cylinder 1 comprises the cylinder body 15, the lock core 17, a coupling device 25, an annular element 27, a retainer device 29, an axial movement limiting device 31, a biasing member in the form of a spring 33, and a stationary blocking member 35. The lock core 17, which is formed as an integral part, comprises a key receptacle 37 for receiving a programmable key. Such a programmable key, which is used to operate an electromechanical lock, comprises an energy source, such as a battery, and a control unit powered by the energy source. The key can access a cloud based or locally hosted access control system which transfer authorization data to the key or log information from the key via internet and a synchronization unit or via a mobile communication system such as the GSM net and a mobile device, such as a mobile phone. In one embodiment the mobile device is the key itself. The key is accessed from the synchronization unit or the mobile device by a physical contact, by near field communication, such as NFC, or by radio communication, such as Bluetooth. The key can store all data necessary to access at least one specific electromechanical key lock but cannot access any electromechanical locks for which it does not have the appropriate authorization data. Locking and unlocking of a lock using the programmable key is rendered possible only if the programmable key is synchronized appropriately via the synchronization unit or a mobile device. Further, such a programmable key is provided with means by which electrical power, data and mechanical effort can be transmitted to the lock in a known manner. The electromechanical lock cylinder 1 is configured to be powered by and communicate with such a programmable key upon the insertion of the key in the key receptacle 37. To this end the electromechanical lock cylinder 1 comprises power receiving means, communication means and an electrical control unit. The electromechanical lock cylinder 1 further comprises an access control device for controlling access of a key inserted in the key receptacle 37. Also, the key receptacle 37 of the lock core 17 is configured such that the lock core 17 rotates together with a programmable key.

The annular element 27 is rotatably and axially displaceably mounted on the hollow lock core portion 39. The coupling device 25 is accommodated inside the hollow lock core portion 39 and secured thereto to rotate together therewith. The coupling device 25 is arranged to, upon the insertion of an appropriate key in the key receptacle 37, rotationally couple the annular element 27 to the lock core 17. To this end the coupling device 25 comprises an electric actuator 41 which is configured to communicate with the access control device. The electric actuator 41 has a pivotable arm 43, as illustrated by arrow A in FIG. 2. The pivotable arm 43 is movable between a rest position, in which rotation of the annular element 27 relative to the lock core 17 is allowed, and a coupling position in which the annular element 27 is rotationally coupled to the lock core 17 by the coupling arm 43. To this end the annular element 27 has a coupling recess 44 which is configured to receive the coupling arm 43 of the coupling device 25.

The coupling device 25 is thus arranged to, upon the insertion of an appropriate key in the key receptacle 37, rotationally lock the annular element 27 to the lock core 17, which enables locking and unlocking rotation of the lock core 17 and thereby enables locking and unlocking of the lock 3, as will be described in detail later with reference to FIGS. 3A-C.

A first end of the annular element 27 forms an engagement portion 27*a* which is configured to mate an engagement portion 17*a* of the lock core 17. The engagement portion 17*a* of the lock core 17 comprises a first contact surface forming a first ramp surface 45 and the engagement portion 27*a* of the annular element 27 comprises a second contact surface forming a second ramp surface 47. The first and second ramp surfaces 45, 47 together form a sliding interface capable of, upon rotation of the lock core 17 relative to the annular element 27, axially displacing the annular element 27 in a direction toward the stationary blocking member 35 into engagement with an engagement portion thereof. Upon such engagement further rotation of the lock core 17 is prevented. To this end a second end of the annular element 27 is provided with a blocking portion 27*b* configured to engage the engagement portion 49 of the stationary blocking member 35. The annular element 27 is thus movable between a non-blocking position, to which it is biased by the spring 33, and a blocking position. The annular element 27 is biased against the lock core 17 by the spring 33 to secure that the ramp surfaces 45, 47 of the sliding interface always are in contact with each other.

The first retainer device 29 is arranged to prevent the annular element 27 from rotating together with the lock core 17 when it is rotated with an inappropriate key, i.e. when the coupling arm 43 is situated in the rest position. To this end the first retainer device 29 comprises a spring biased ball 51 which is received in an axial groove 53 formed in the annular element 27.

The stationary blocking member 35, which in this case is formed by a ring, is secured to the cylinder body 15. The engagement portion 49 of the sleeve 35 comprises axially extending recesses 55 facing the blocking portion 27*b* of the annular element 27. The recesses 55 of the stationary blocking member 35 are configured to interact with teeth 57 of the blocking portion 27*b* of the annular element 27. In this embodiment the stationary blocking member 35 is thus formed as a separate part which is secured to the cylinder body 15 and thereby stationary. It is however appreciated that a stationary brake/blocking member may be formed as projecting portion(s) of the cylinder body itself.

The axial movement limiting device 31 is arranged to prevent axial movement of the annular element 27 upon rotation of the lock core 17 with an appropriate key. To this end the axial movement limiting device 31 comprises a spring biased ball 59 which is received in an axial groove 61 formed in the annular element 27.

The ramp surfaces 45, 47, the first retainer device 29, the blocking portion 27*b* of the annular sleeve 27 and the engagement portion 51 of the stationary blocking member 35 together form part of a blocking arrangement 63 that serves to prevent unauthorized rotation of the lock core 17 and thereby prevent unauthorized locking and unlocking of the lock 3.

With reference to FIGS. 3A-C and FIGS. 4A-C, the function of the electromechanical lock cylinder 1 will now be described.

Figure 3A:
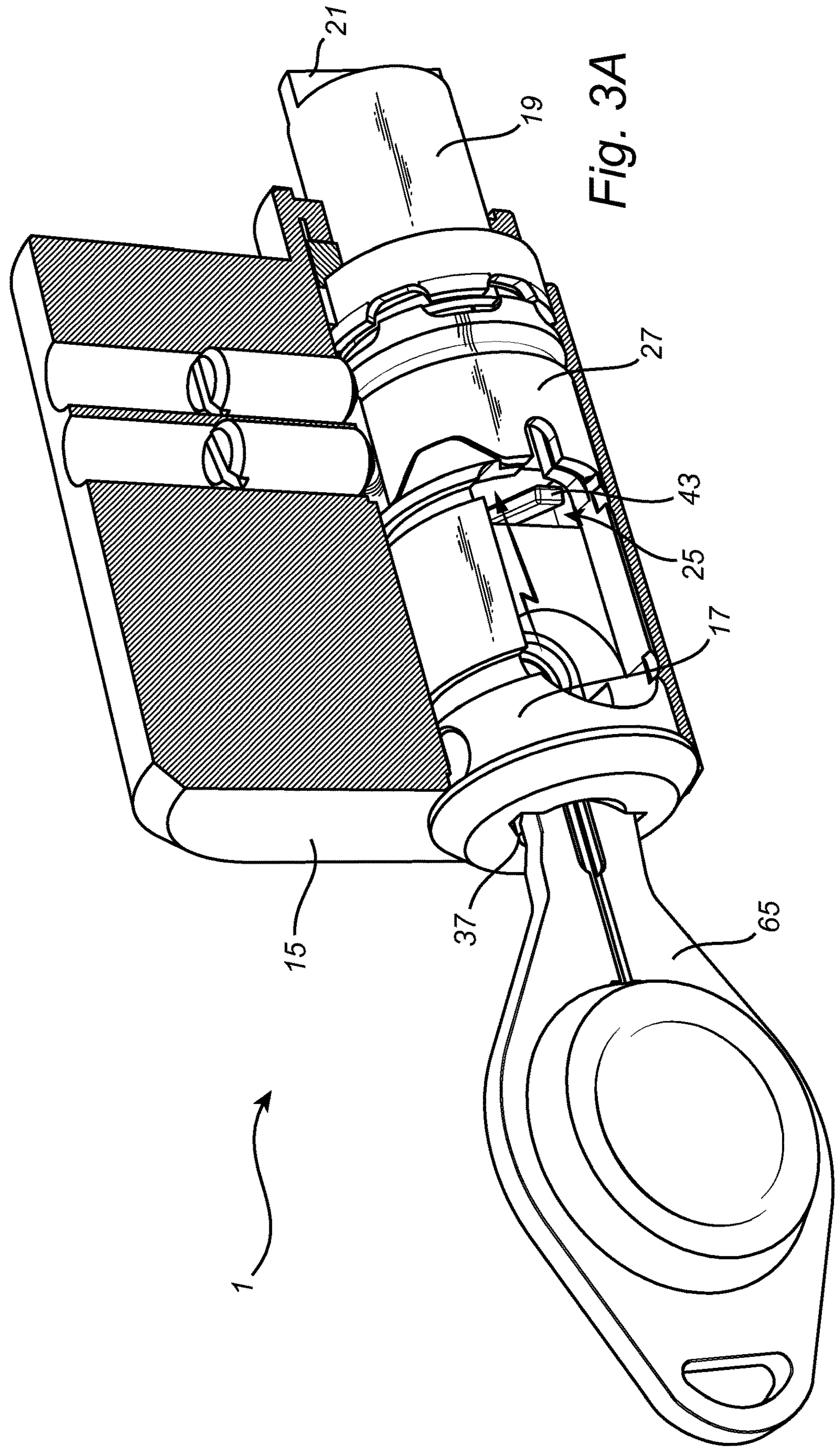
FIGS. 3A-C are a partly cross-sectional perspective views and illustrate the function of the electromechanical lock cylinder when an appropriate key is inserted in a key receptacle thereof.
Figure 3B:
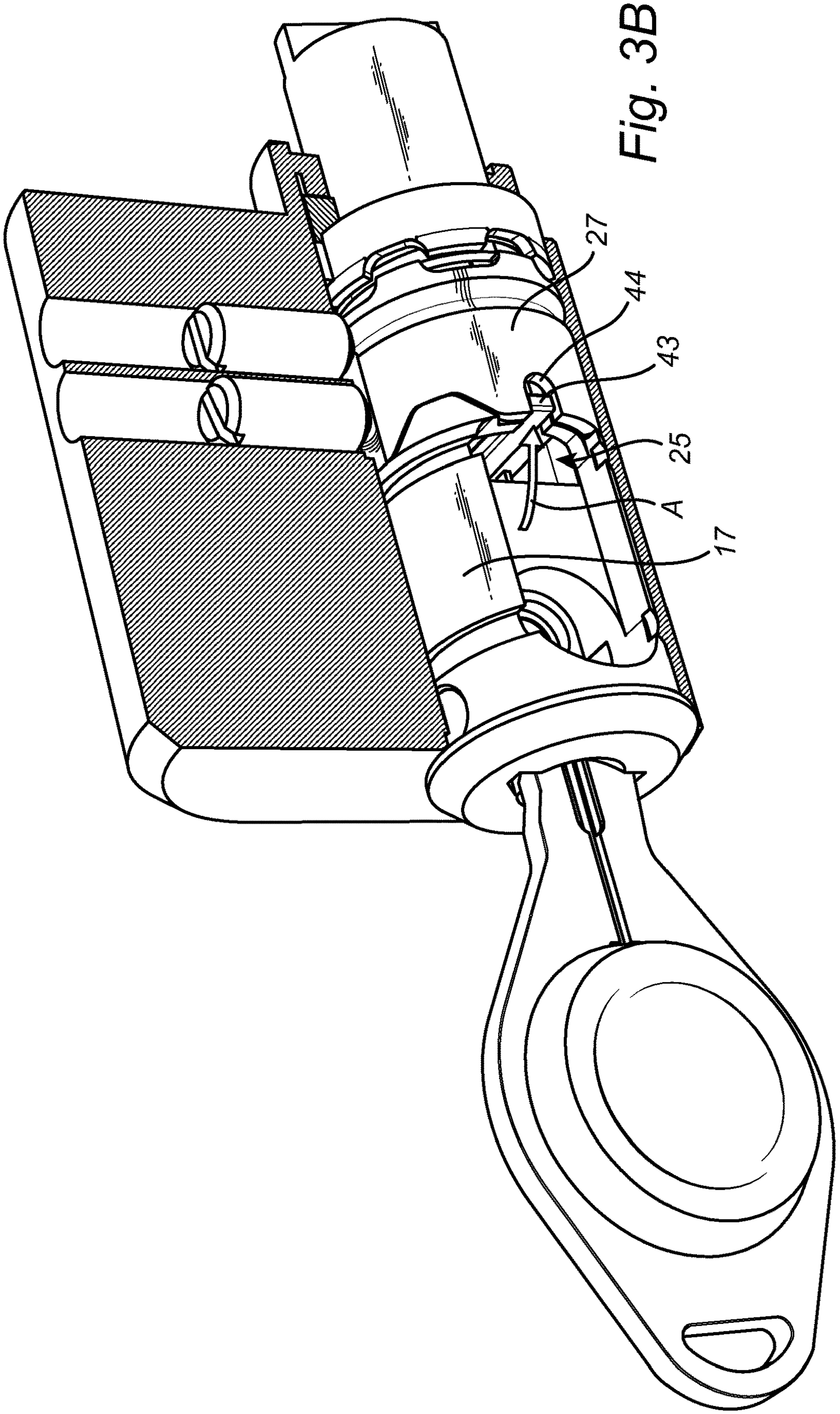
Figure 3C:
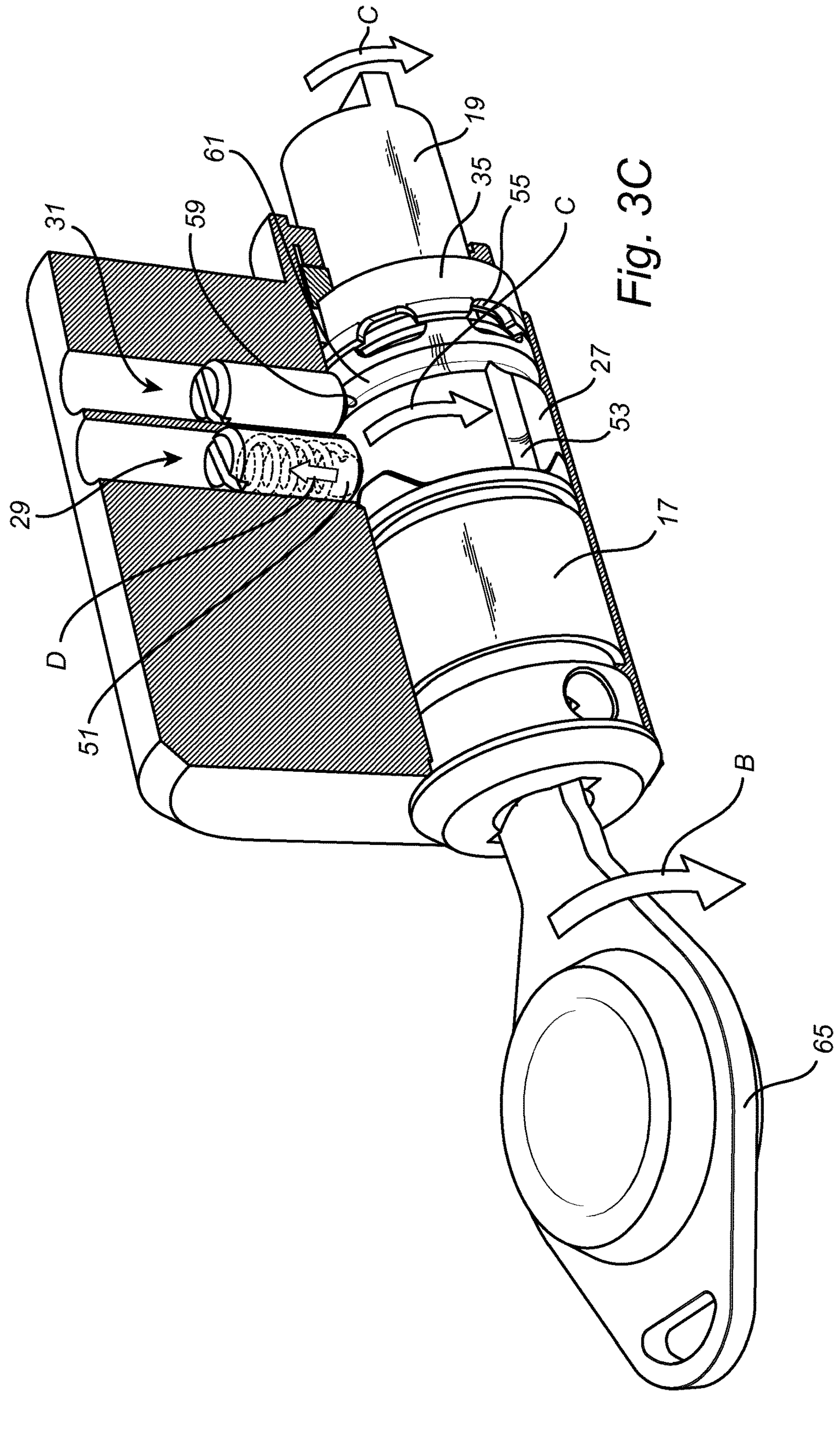

FIG. 3A illustrates a state in which an appropriate key 65 is inserted in the key receptacle 37 of the lock core 17 and the lock core 17 is situated in a position which corresponds to a locked state of the electromechanical lock 3. Then, the projecting portion 21 of the lock bolt operating member 19 typically extends in a vertical direction. Upon insertion of the key 65 in the key receptacle 37 power is transferred to a power receiving means (not shown) of the lock core 17 for powering of the electromechanical lock cylinder 1. Also, the access control device controls whether it is an appropriate key or not. In case an appropriate key 65 is inserted, as in this case, the electric actuator 41 is activated whereby the coupling arm 43 thereof is moved from its rest position, illustrated in FIG. 3A, to its coupling position, in which it is received in the coupling recess 44 of the annular element 27, as illustrated by arrow A in FIG. 3B. Then, the annular element 27 is rotationally coupled to the lock core 17. Turning of the key 65, as illustrated by arrow B in FIG. 3C, then causes the annular element 27 to rotate together with the lock core 17 and the lock operating member 19, as illustrated by arrows C in FIG. 3C, thereby enabling unlocking of the lock 3. Upon turning of the appropriate key 65 the spring biased ball 51 of the retainer device 29 is displaced form the axial groove 53, as illustrated by arrow D in FIG. 3C.

When the coupling arm 43 is moved to the coupling position, rotation of the lock core 17 to unlock the lock 3 is thus enabled. The coupling arm 43 may be held in the coupling position during the complete rotation of the lock core 17 during unlocking of the lock 3 or during only an initial phase thereof. In the latter case, the coupling arm 43 need to be held in the coupling position until the retaining member 51 of the retaining device 29 has been displaced from its retaining position in the axial groove 53.

Upon rotation of the lock core 17 using the appropriate key 65, the ball 59 of the axial limiting device 31 is received in the annular groove 61 to prevent axial movement of the annular element 27. The axial movement limiting device 31 thereby secures that the blocking teeth 57 of the annular element 27 are separated from the recesses 55 of the stationary blocking element 35 upon rotation of the lock core 17 with an appropriate key 65. The axial limiting device 31 serves to minimize the use of the coupling device 25. Hence, thanks to the axial limiting device 31 the electrical actuator of the coupling device 25 need to be powered only in an initial phase of the rotation of the lock core 17, i.e. under a very short period of time, which is allows for an assembly with a very low power consumption. The electromechanical lock cylinder 3 thus comprises an electric actuator, which may be in the form of a solenoid, to enable rotation of the lock core 17 for unlocking the lock 3.

Figure 4A:
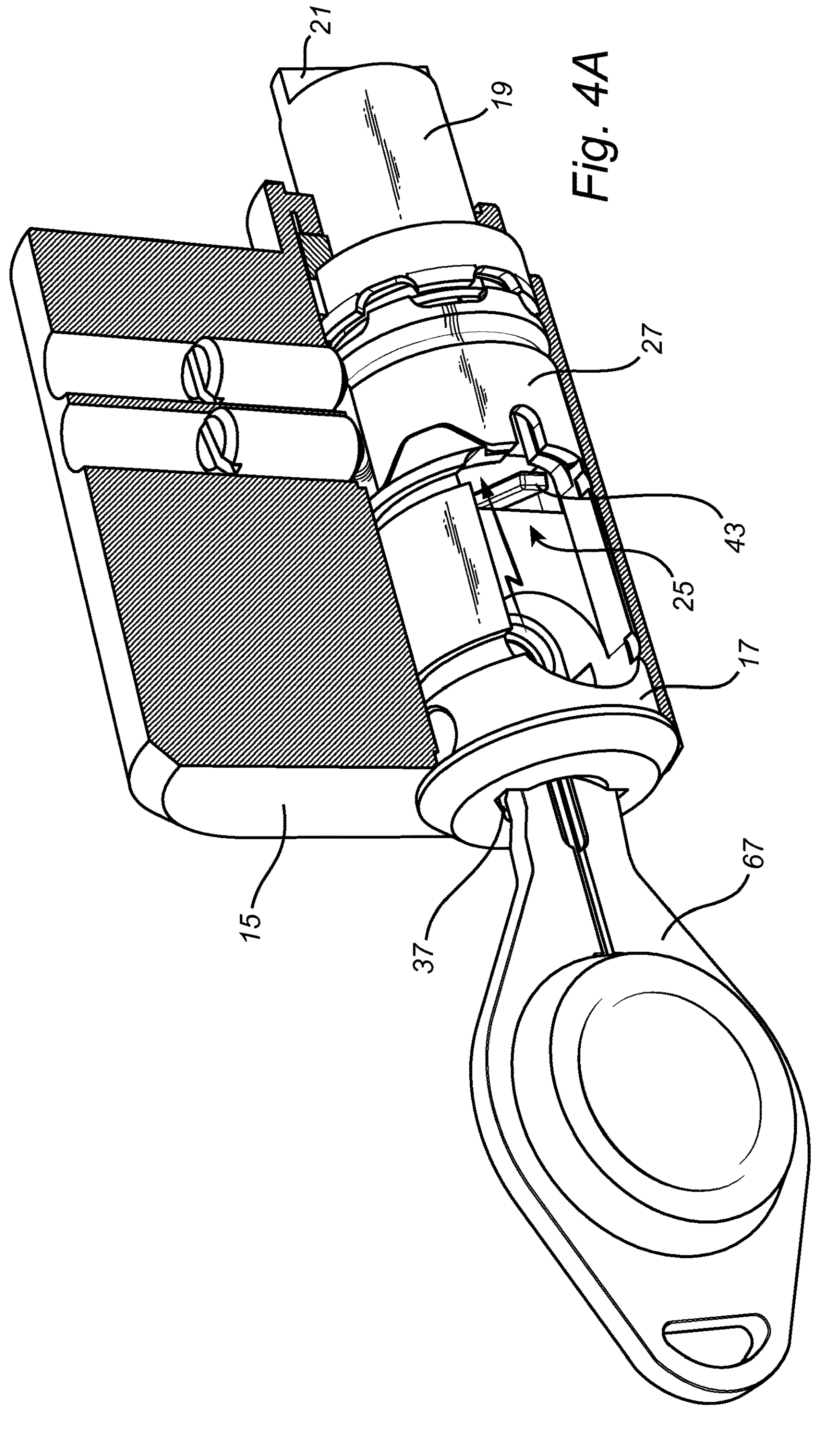
FIGS. 4A-B are a partly cross-sectional perspective views and illustrate the function of the electromechanical lock cylinder when an inappropriate key is inserted in a key receptacle thereof.
Figure 4B:
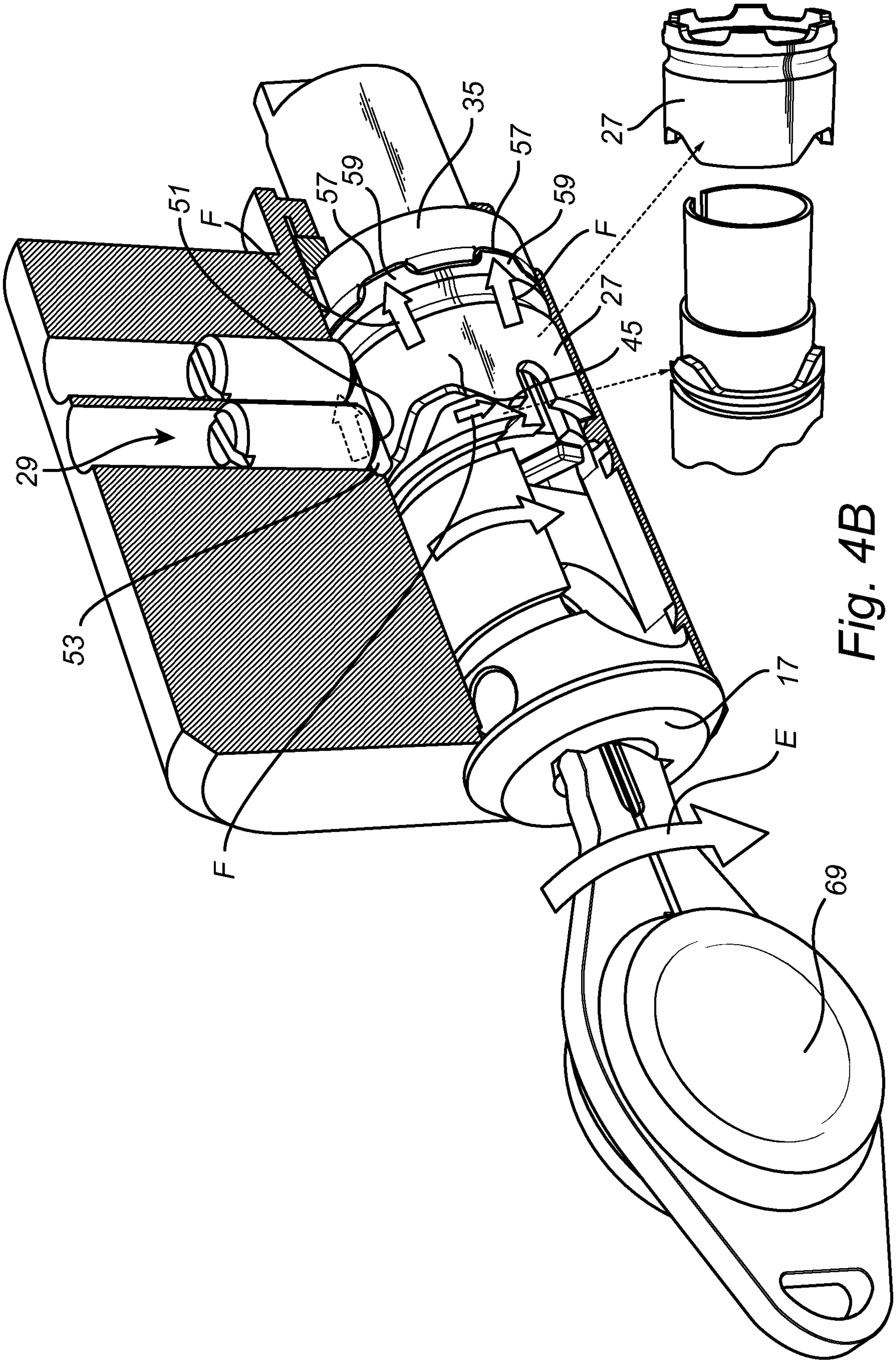

FIG. 4A illustrates a state in which an inappropriate key 67 is inserted in the key receptacle 37 of the lock core 17 and the lock core 17 is situated in a first position which corresponds to a locked state of the electromechanical lock 3 and in which the projecting portion 21 of the lock bolt operating member 19 extends in a vertical direction.

Upon insertion of the inappropriate key 67 in the key receptacle 37 power is transferred to the lock core 17 in the same manner as described hereinbefore with reference to FIG. 3A. Also, the access control device controls whether it is an appropriate key or not. In this case, in which an inappropriate key 67 is inserted, the coupling device 25 is not activated. The coupling arm 43 then remains in the rest position which position is illustrated in FIG. 4A. Then, rotation of the lock core 17 relative to the annular element 27 is possible, as illustrated by arrow F in FIG. 4B. Rotation of the lock core 17 relative the annular element 27 is enabled by the retainer device 29, the retaining ball 51 of which prevents the annular element 27 from rotating with the lock core 17. The spring biased ball 51, which is received in the axial groove 53, thus prevents the annular element 27 from rotating as the lock core 17 rotates. Turning of the key 67, as illustrated by arrow E in FIG. 4B, then causes the ramp surface 45 of the lock core 17 to slide against the ramp surface 47 of the annular element 27 and thereby the annular element 27 to move into engagement with the stationary blocking element 35, as illustrated by arrows G in FIG. 4B, thereby preventing further rotation of the lock core 17 in the actual direction. Unlocking of the lock 3 is then prevented. More specifically, upon axial movement of the annular sleeve 27 caused by rotation of the lock core 17 using an inappropriate key 67, the teeth 59 of the annular element 27 are moved into the recesses 57 of the stationary blocking member 35, which results in mechanical engagement that blocks further rotation of the lock core 17. Hence, upon rotation of the lock core 17 with the coupling arm 43 in the rest position, the retaining ball 51 of the retainer device 29 prevents the annular element 27 to rotate together with the lock core 17. Then, the ramp surfaces 45, 47 slide relative each other and cause the annular element 27 to move axially in a direction towards the stationary member 35 until the engagement portion 27*b* engages the engagement portion 49 of the stationary blocking member 35. Then, further rotation of the lock core 17 is mechanically blocked by the ramp surfaces 45, 47 and the teeth 59 received in the blocking recesses 57. Upon axial movement of the annular element 27 the retaining ball 51 is displaced, in the axial groove, relative to the lock core 17, as illustrated by the dotted arrow in FIG. 4B.

Figure 5:
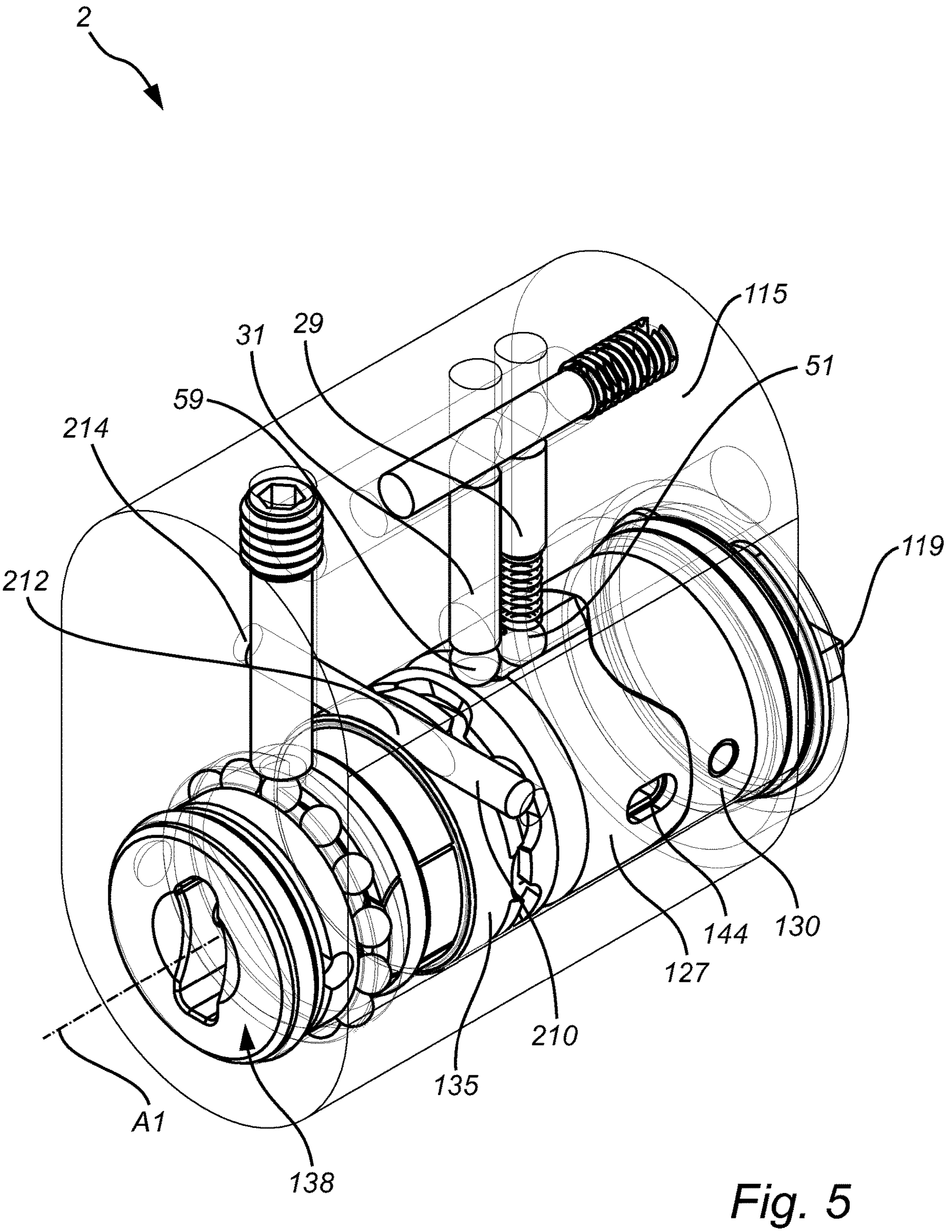
FIG. 5 shows an alternative embodiment of the electromechanical lock assembly in an assembled state.
Figure 6:
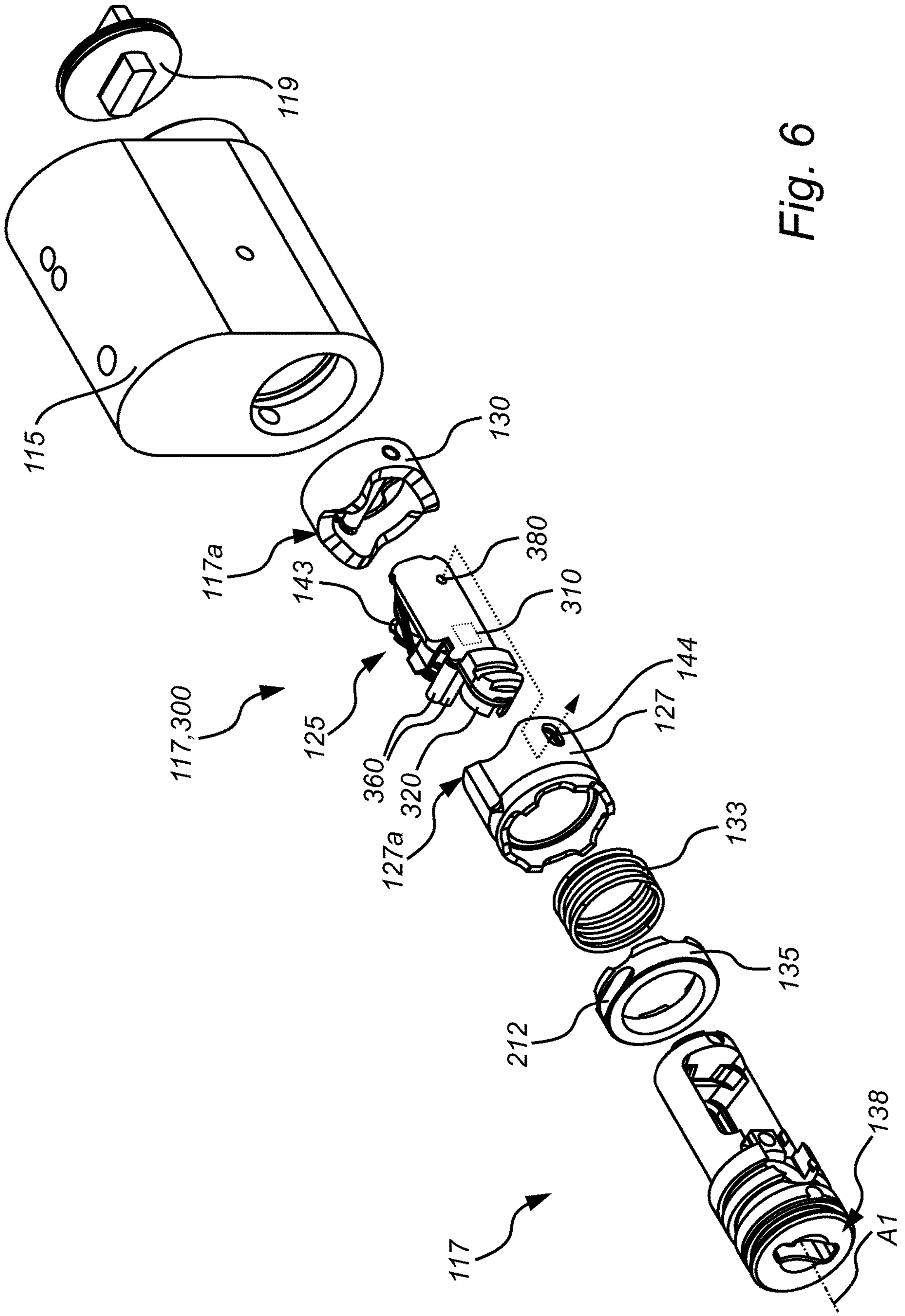
FIG. 6 shows an exploded view of the alternative embodiment.

Below, in connection with FIGS. 5-8, there is shown a second example embodiment of the electromechanical lock assembly, henceforth being referred to as the second example. The second example is identified as an electromechanical lock assembly having reference numeral 2 below. FIGS. 5 and 6 may with advantage be viewed in parallel during reading of the description of the parts in connection with these figures. The second example embodiment shares a plurality of the above-described features associated with the previously described example embodiment, henceforth being referred to as the first example. To avoid undue repetition, reference is therefore made to the above, when applicable. Thus, the forthcoming description will primarily emphasize differences between the first example and the second example, occasionally including a short recap of selected parts/features of the first example. If nothing else is stated, relevant parts of the electromechanical lock assembly 1;2 is manufactured from a durable material such as stainless steel, aluminum, brass, or any suitable compound thereof. Involved electrical conductors typically comprise highly conductive metals, such as copper, silver, gold, or any adequate highly conducting alloy.

In connection with the first example there is disclosed an annular element 27 being rotatably and axially displaceably mounted on a lock core 17. The annular element 27 can either be rotationally locked relative to the lock core 17 upon rotation of an appropriate key when inserted in a key receptacle 37, or rotate and/or axially move relative to the lock core 17 upon rotation of an inappropriate key, causing the annular element 27 to be axially displaced along an axial extension of the lock core to engage a stationary blocking member 35, thereby blocking further rotation of the lock core. The annular element 27 of the first example is understood being axially displaceable along the axial direction of the lock core 17 away from a front face 138 (reference numeral introduced in FIG. 5) of the key receptacle 37 of the lock core. Such an axial displacement is enforced by the engagement portion 17*a* axially located between a front face of the key receptacle 37 and the annular element 27.

Now turning to the second example in connection with FIGS. 5 and 6. The second example comprises a stationary blocking member 135. The second example comprises an annular element 127. The annular element 127 is rotatably and axially displaceably mounted on the lock core 117. The stationary blocking member 135 is located between the front face 138 of the key receptacle 37 and the annular element 127. The stationary blocking member 135 is thereby located in an axially opposing side of the lock core compared to the stationary blocking member 35 of the first example. Upon rotation of an appropriate key, the annular element 127 is rotationally and axially locked relative to the lock core 117, thereby allowing unlocking the electromechanical lock. The second example comprises an engagement portion 117*a* which forms a part of a connecting element 130, which will be further described below in connection with FIG. 8. Compared to example 1, the engagement between the annular element 127 and the engagement portion is located on an axially opposing side of the annular element 127. Upon rotation of an inappropriate key, the engagement portion 117*a* of the connecting element 130 enforces the annular element 127 to be axially displaced along the axial direction and received by the stationary blocking member 135, the annular element 127 thereby being prevented to rotate further. The stationary blocking member 135, the annular element 127, and the engagement portion 117*a* are thereby axially located in an axially reversed order compared to the corresponding parts in the first example. The annular element is 127 thereby enforced to be axially displaced towards the front face 138 of the key receptacle 37 upon rotation of an inappropriate key.

The stationary blocking member 135 is annularly shaped and arranged circumferentially around the lock core 117 such that the lock core 117 is freely rotatable in respect thereto. The stationary blocking member 135 is rotationally and axially secured to the lock body 115 by a locking pin 210. The locking pin 210 may have a substantially cylindrical geometry. The locking pin 210 has an outer surface geometry to be at least partly received by a substantially geometrically complementary groove 212 on the stationary blocking member 135. The locking pin 210 is, in a mounted position, located in an elongated cavity 214 of the lock body 115 having a surface geometry complementary to the outer surface geometry of the locking pin 210. When the lock body 115, the locking pin 210, and the stationary blocking member 135 are in a mounted position, as illustrated in FIG. 5, the outer surface geometry of the locking pin 210 is at least partly received in the groove 212 of the stationary blocking member 135 while the locking pin 210 is located in the cavity 214 of the lock body 115. In such a mounted position, the lock core 117 and the locking pin 212 will, together, engage with the stationary blocking member 135 such that the stationary blocking member 135 will be essentially non-movable relative to the lock body 115. The cavity 214 of the lock body 115 may extend transversely relative to the axial direction A1 of the lock core 117.

In connection with FIG. 6 there is shown an exploded view of selected parts of the second example 2. The lock core 117 comprises a lock core board 300. The lock core board 300 comprises a current-receiving device 320, best viewed in FIG. 7. The current-receiving device 320 is similar between example 1 and 2. The current-receiving device 320 receives electrical current from a programmable key inserted in the key receptacle 37. The lock core board 300 comprises circuitry 310 for determining a validity of a programmable key inserted in the key receptacle 37. The lock core board 300 is the sole part of the electromechanical lock assembly 2 that includes electrical components, hence facilitating maintenance and replacement of an electrical component, as the remaining parts of the lock core 117 are exclusively mechanical components. The lock core board 300 comprises a plurality of transverse elements 360 for preventing a foreign object being inserted by force in the key receptacle 37. The lock core board 300 comprises a coupling device 125. The coupling device 125 comprises a coupling member 143. The coupling device 125 and the coupling member 143 are best viewed in FIG. 7. The coupling member 143 is linearly movable along a direction being transverse to the axial direction of the lock core 117. Preferably, the coupling member 143 is linearly movable along a direction being in a span of between −30 and +30 degrees from a direction being essentially perpendicular to the axial extension of the lock core 117. More preferably, the span is between −20 and +20 degrees, and even more preferably the span is between −10 and +10 degrees. Hence, the coupling device 125 may be seen as a linear actuator. The coupling member 143 comprises a locking portion 143*b*; see FIG. 7. The locking portion 143*b* is arranged to penetrate a through-going opening 380 in the lock core board 300 upon locking and unlocking the electromechanical lock of example 2. The annular element 127 comprises a geometrically complementary portion 144 being complementary to the locking portion 143*b* of the coupling member 143. The locking portion 143*b* of the coupling member 143 is arranged to be received in the geometrically complementary portion 144 of the annular element 127. The geometrically complementary portion 144 may be a through-going opening. The geometrically complementary portion 144 may be an axially elongated through-going opening having an elongated extension directed along the axial direction A1. Alternatively, the geometrically complementary portion 144 may be a substantially circular through-going opening. The geometrically complementary portion 144 may hence have a substantially circular geometry. The geometrically complementary portion 144 may alternatively be a geometrically complementary cavity. Upon rotation of the lock core 117 using an appropriate programmable key inserted in the key receptacle 37, the locking portion 143*b* substantially instantaneously moves linearly until being at least partly received by the complementary portion 144, thereby rotationally and axially locking the annular element 127 relative to the lock core 117.

In connection with FIG. 7 there is shown further details of the lock core board 300, and particularly the coupling device 125. The coupling device 125 is movable between a locking position, FIG. 7D, and a non-locking position, FIG. 7C. The coupling device 125 is biased towards the non-locking position by a biasing member 233. Preferably, the biasing member 233 is a spring 233. Alternatively, the biasing member 233 may be any adequate flexible or magnetic element. The coupling device 125 comprises a coupling member solenoid 243 located circumferentially around a portion of the coupling member 143. The coupling member solenoid 243 is connected to the circuitry 310 of the lock core 117 by means of flexible connection cords 330, FIG. 7A. The current-receiving device 320 is connected to the circuitry 310 by means of connection cords 340. When unlocking or locking the electromechanical lock, the coupling member solenoid 243 is powered by the programmable key provided the programmable key is an appropriate key, i.e., provided a valid access right has been communicated between the programmable key and circuitry 310 of the lock core board 300 for unlocking the electromechanical lock. The coupling member solenoid 243 may have a substantially cylindrical geometry having an axial extension. The coupling member 143 may be an elongated pin as shown in FIG. 7B. The coupling member 143 may be oriented substantially parallel to the axial extension of the coupling member solenoid 243. The lock core 117 comprises a permanent magnet 240; see FIG. 7B. The coupling device 125 is movable relative to the permanent magnet 240. The permanent magnet 240 may have a cylindrical geometry being hollow along an axial extension of the permanent magnet 240. The coupling member 143 is arranged to be at least partly located inside a hole 241 of the permanent magnet 240. The permanent magnet 240 is thereby geometrically arranged such that a north pole of the permanent magnet 240 is substantially aligned along an axial extension of the coupling member solenoid 143. The coupling member solenoid 143 may, when being electrically powered, thereby substantially interact magnetically with the permanent magnet 240. Hence, the locking portion **143*b* may move, according to the above, to rotationally and axially lock the annular element 127 to the lock core 117 when the appropriate programmable key is inserted in the key receptacle 37**.

The lock core board 300 further comprises an impulse dampening arrangement 350. The impulse dampening arrangement 350 comprises a first and a second dampening type. Both the first and the second dampening type may prevent movement of the coupling member 143 upon exposing the electromechanical lock assembly 2 to mechanical impulses. The impulse dampening arrangement 350 may thereby prevent an unauthorized axial and rotational locking of the annular element 127 to the lock core 117.

The first dampening type is based on an induced electrical current in the coupling member solenoid 143 to prevent a relative movement of the coupling member 143 relative to the lock core board 300. The impulse dampening arrangement of the first type is for the example embodiment arranged to electrically connect the connection cords 330 of the coupling member solenoid 143 to establish a closed electrical circuit. This may be achieved by electronic switching means located on the circuitry 310, wherein the switching means is configured to short-circuit the connection cords 330. The electromechanical lock assembly 2 is configured such that the electrical circuit defined by the electrically connected connection cords 330 and the coupling member solenoid 143 is closed (i.e., short-circuited) in an absence of an appropriate key being inserted in the key receptacle 37. Hence, the impulse dampening of the first type will be turned on at all times, except while an appropriate key is inserted in the lock, upon which insertion the electromechanical lock assembly 2 is configured to open the short-circuited coupling member solenoid 143 and instead direct a current thereto for moving the coupling member solenoid 243 into engagement with the annular element 127 for locking and unlocking the lock.

Hence, in an absence of an appropriate key inserted in the lock and upon such a relative movement between the coupling member solenoid 243 and the lock core board 300, an electrical current is temporarily generated in the coupling member solenoid 243 by the presence of the permanent magnet 240 according to Lenz law. Such an electrical current thereby generates a magnetic force between the coupling member solenoid 243 and the permanent magnet 240 to counteract a movement of the coupling member 143 relative to the lock core 117. In absence of the impulse dampening arrangement, the coupling member 143 may, in the event of an impulse having a vector component along the extension of the coupling member 143, be moved to such an extent that the locking portion **143*b* is received by the geometrically complementary portion 144 of the annular element 127. The impulse dampening arrangement of the first dampening type may thereby function as a magnetic brake to prevent such a situation. A person skilled in the art readily appreciates that many variations of the impulse dampening arrangement of the first dampening type is achievable within the scope of the claims, such as actively modifying/modulating an electrical current through the coupling member solenoid 243**, etc.

Figure 7A:
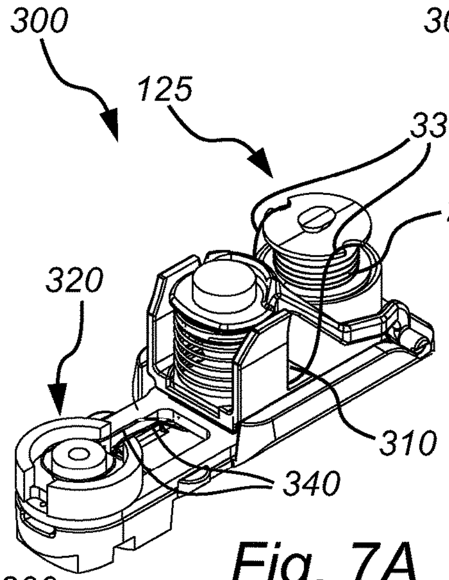
FIGS. 7A-E show a coupling device and an impulse dampening arrangement of the alternative embodiment.
Figure 7B:
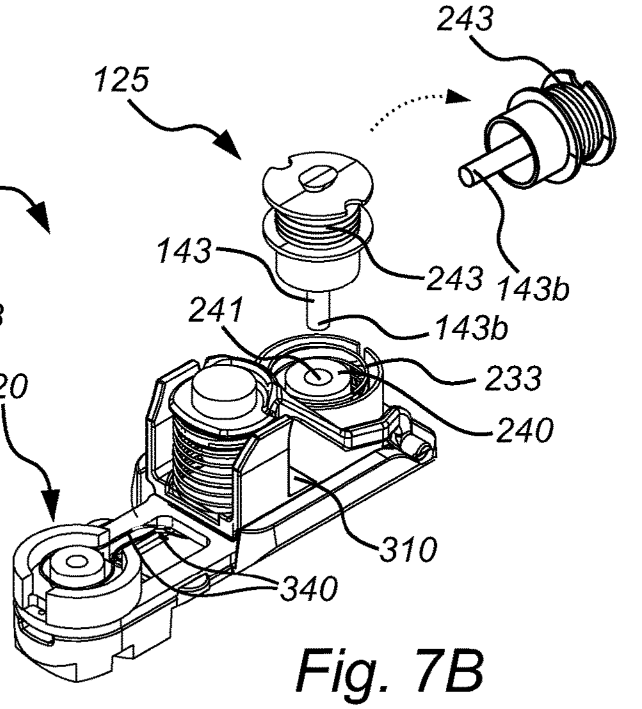
Figure 7C:
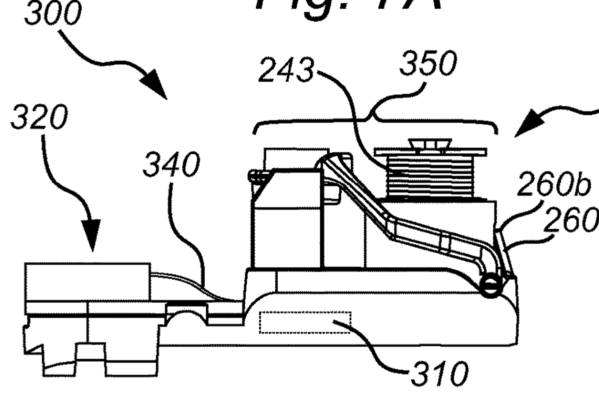
Figure 7D:
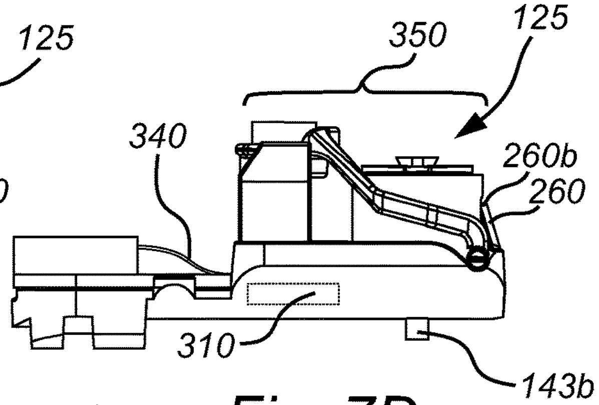
Figure 7E:
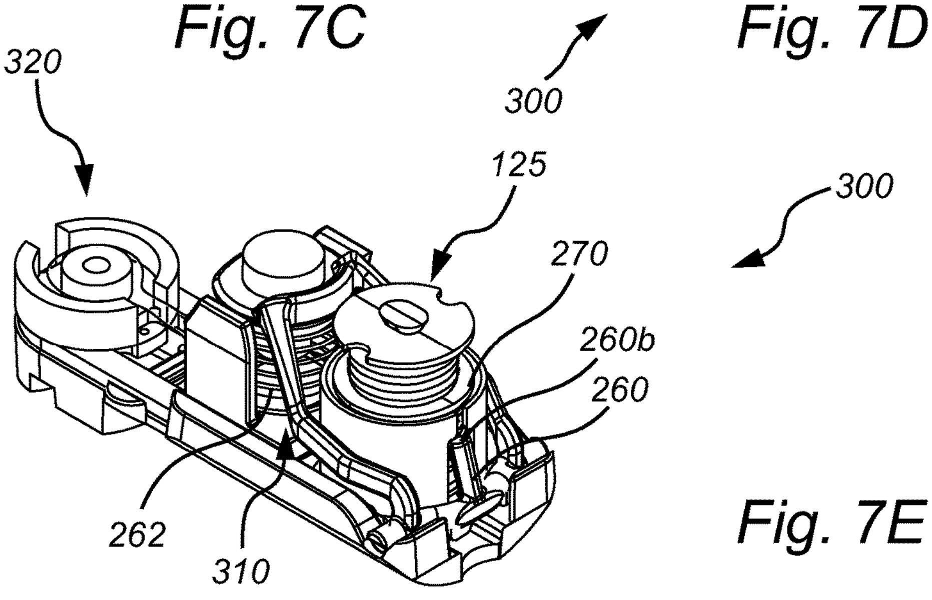

Now turning to FIG. 7E, emphasizing the second dampening type. The impulse dampening arrangement 350 may further comprise a pivotable arm 260 arranged to be pivoted relative to the lock core 117 and the coupling device 125 upon exposing the electromechanical lock assembly 2 to a mechanical impulse. The pivotable arm 260 is structured and arranged to block a movement of the coupling device 125 relative to the lock core 117 in response to such an impulse. An end portion **260*b* of the pivotable arm 260 is moved to such an extent towards the coupling device 125 that a circumferential edge portion 270 of coupling device 125 strikes the edge portion 260*b*, the coupling device 125 thereby being prevented to move further towards the locking position. The pivotable arm 260 forms part of an arrangement of similar mass as the coupling device 125. The arrangement is biased by a biasing member 262 to a position where the pivotable 260 arm allows the coupling device 125 to move between the non-locking position and the locking position. Preferably, the biasing member 262 is a spring 262 having a spring constant similar to the spring constant of the spring 233 associated with the locking/non-locking position of the coupling device 125. Alternatively, the biasing member may be any other adequate flexible or magnetic element. When the electromechanical lock assembly 2 is exposed to a mechanical impulse, the pivotable arm 260 and the coupling device 125 move simultaneously in response to the impulse, whereby, as per the above, the pivotable arm 260 prevents the coupling device 125 to move freely, thereby preventing an unauthorized move of the locking portion of the coupling device 125 to be received by the geometrically complementary portion 144 of the annular element 127, thereby ultimately preventing the annular element 127 to unauthorizedly rotate together with the lock core 117**.

An intrinsic feature of the impulse dampening arrangement 350 is that the first and the second dampening type react differently to a mechanical impulse. The first type has a dynamic response as a result from the counterforce increasing with the penetration depth of the coupling member 143 into the permanent magnet 240. The second type instead has a linear behaviour. As readily appreciated by the person skilled in the art, the first type may be more suitable for dealing with strong impulses, whereas the second type may be more suitable for dealing with pulse trains of mechanical impulses tuned near or onto a natural frequency of the mechanical system. Thus, although each of the two types of impulse dampening may be used in isolation, a combination of the two types is beneficial to provide the best protection to any intervention from the outside creating mechanical impulses.

Now turning to FIG. 8, emphasizing some of the above-mentioned features, as well as provision of additional security aspects of the second example 2 of the electromechanical lock assembly. The stationary blocking member 135 of the second example is located in between a front face 138 of the key receptacle 137 and the annular element 127 along the axial direction. The contact surfaces 145;147 are thereby configured to, upon rotation of the lock core 117 relative to the annular element 127 by an inappropriate key, axially move the annular element 127 along the axial direction A1 towards front face 138 of the key receptacle 37 to move into engagement with the stationary blocking member 135; see FIG. 8D. An end portion of the annular element 127 thereby has a first set of engagement teeth 127*b*. Conversely, an end portion of the stationary blocking member 135 has a second set of engagement teeth 135*b*. The end portion of the annular element 127 is axially directed towards the end portion of the stationary blocking member 135. Hence, the first set of engagement teeth 127*b* is substantially circumferentially complementary relative to the second set of engagement teeth 135*b*. Hence, engagement of the annular element 127 and the stationary blocking member 135 may prevent the annular element 127 to rotate relative to the stationary blocking member 135 around the axial direction A1 of the lock core 117.

Figure 8A:
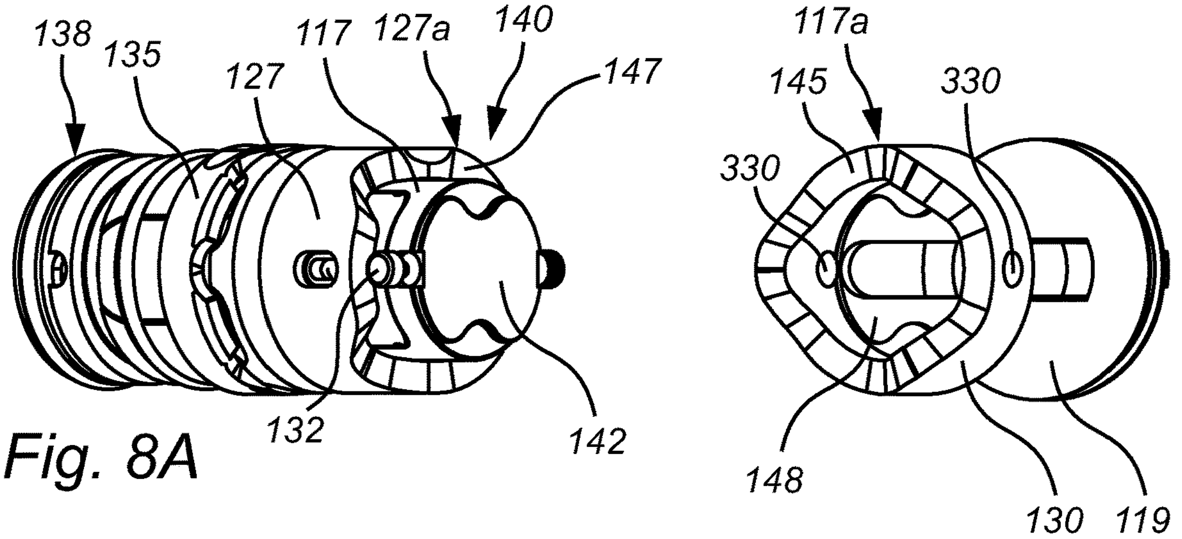
FIGS. 8A-D show additional security features associated with unauthorized unlocking attempts of the alternative embodiment.
Figure 8B:
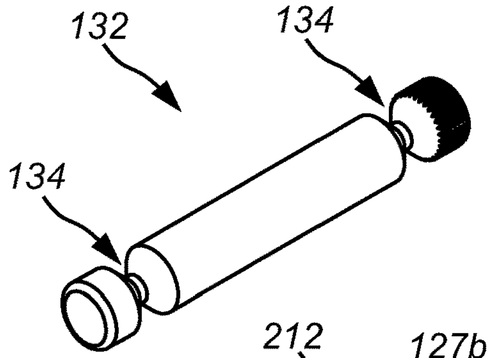
Figure 8C:
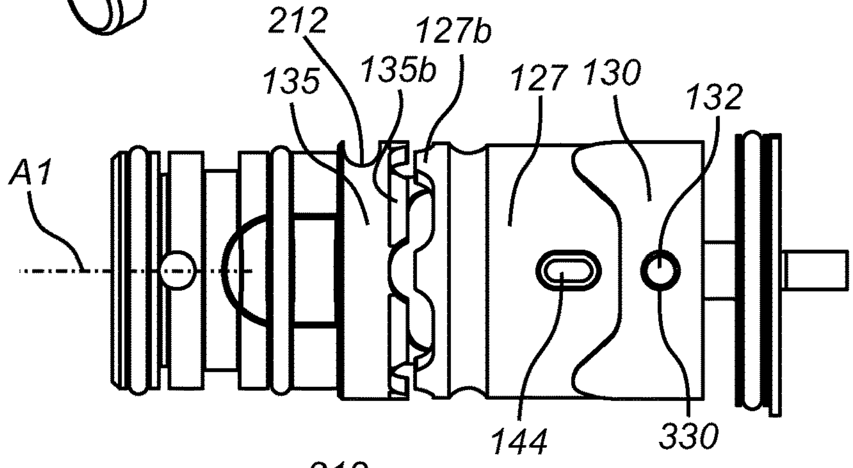
Figure 8D:
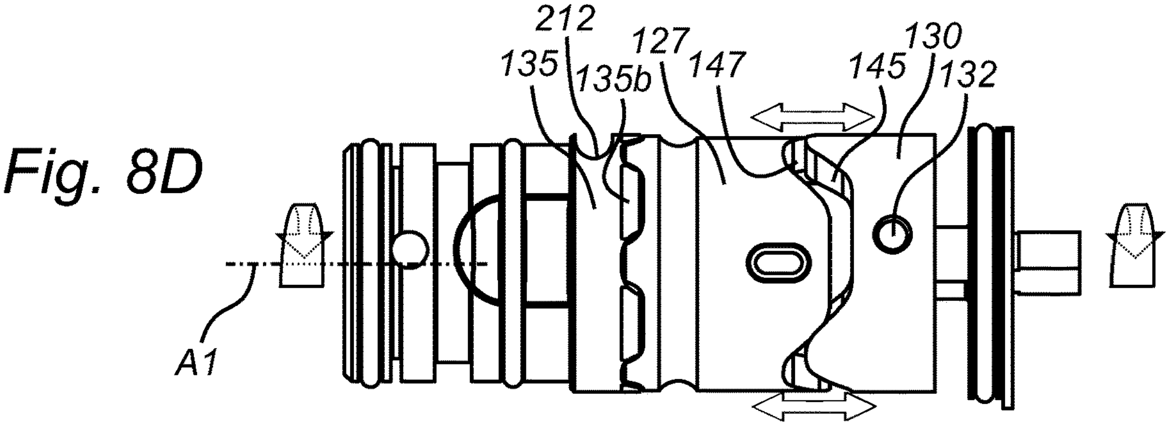

In connection with FIG. 8A, there is shown details of an end portion 140 of the lock core 117 and parts in connection thereof. For the electromechanical lock as such, the first contact surface may be situated on the lock core, as is indeed the case for example 1 illustrated in FIGS. 1-4. However, for the present example embodiment, example 2, the first contact surface 145 is situated on another element, connecting element 130, which is separate from but connected to the lock core 117. The connecting element 130 is rotationally secured to the lock core 117 and to the lock bolt operating member 119. The first contact surface 145 and a second contact surface 147 may be substantially complementary. An axial component of respective contact surface 145;147 may be smooth and/or slowly varying to allow an axial separation of the annular element 127 and the connecting element 130 upon a relative rotation of the elements 127;130 around the axial direction A1. The connecting element 130 may at least partly be received in an end portion 140 of the lock core 117, wherein the end portion 140 of the lock core 117 is located on an axially opposing side of the lock core 117 relative to the front face 138 of the key receptacle 37. The connecting element 130 may be fixedly connected to the lock core 117 via a break pin 132. The break pin 132 is located in a through-going opening in the end portion 140 of the lock core 117, and end portions of the break pin 132 are located in through-going openings 330 on the connecting element 130. Since the connecting element 130 is circumferentially arranged with respect to the lock core the break pin 132 and the lock core together forces the connecting element 130 to be rotationally and axially fixed relative to the lock core 117. The break pin 132 is arranged to break upon a relative force, applied between the lock core 117 and the connecting element 130, exceeding a threshold force. The break pin 132 has an elongated geometry, thereby having an axial extension. A cross-sectional area defined transverse to the axial extension of the break pin 132 may vary long the axial extension of the break pin 132. Specific axial regions 134, FIG. 8B, along the axial extension of the break pin 132 may have cross-sectional areas being significantly smaller relative to the remaining axial regions along the axial extension of the break pin 132. Such specific axial regions 134 may constitute weak regions of the break pin 132. Hence, if the force exceeds the threshold force, the break pin 132 is arranged to break in vicinity of one or both of the weak regions 134. Alternatively, the break pin 132 may be at least partly manufactured by a material having a relatively low strength. The break pin 132 is shown in isolation in FIG. 8B, emphasizing a preferred axial geometry of the break pin 132.

The connecting element 130 is, further, rotationally secured to the lock core 117 by means of a locking arrangement 142;148 which is arranged to rotationally secure the lock core 117 to the connecting element 130 in an absence of an axial movement of the annular element 127 into engagement with said stationary blocking member 135, and to rotationally unsecure the connecting element 130 from the lock core 117 upon a rotation of the lock core 117 relative to the annular element 127 when the annular element 127 is in engagement with the stationary blocking member 135.

The end portion 140 of the lock core 117 may comprise a protruding relief 142 being a part of the locking arrangement 142;148. The protruding relief 142 may have any adequate geometry that allows to rotationally secure the lock core 117 and the connecting element 130 together. The connecting element 130 comprises a complementary cavity 148 being geometrically complementary to the protruding relief 142. Alternatively, the protruding relief 142 may be located at the connecting element 130, and the complementary cavity 148 may be located on the end portion 140 of the lock core with remained function. Notice that the connecting element 130 is disassembled from the lock core 117 and rotated away from the axial direction of the lock core 117 in FIG. 8A to emphasize the relevant described parts thereof. Further, the lock bolt operating member 119 and the connecting element 130 are slightly separated to facilitate visualization in FIG. 8A. The protruding relief 142 is arranged to be received by the complementary cavity 132 upon rotation of an appropriate key. Hence, a circumferential edge of the protruding relief 142 and a mating circumferential edge of the complementary cavity 132 withstand a significant torque upon rotation by an appropriate key, to thereby prevent accidental breaking or unnecessarily fatigue the break pin 132.

If instead an inappropriate key is inserted and rotated a few degrees, the annular element 127 axially moves towards the stationary blocking member 135 to engage the stationary blocking member 135 such that further rotation of the inappropriate key is prevented. As described above, the relative axial movement between the annular element 127 and the fixed annular element 130 is enforced by a mutual sliding between the first contact surface 145 and the second contact surface 147. Should the inappropriate key be further rotated while the annular element 127 and the stationary blocking member 135 are engaged, FIG. 8D, the contact between the contact surfaces 145;147 will force the annular element 127 and the connecting element 130 to separate from each other which results in the locking arrangement 142:148 rotationally unsecuring the connecting element 130 from the lock core 117. The separation will exert an axially directed force on the break pin 132, thereby to be broken by possibly large axially directed shear forces on the weak regions 134 of the break pin 132. Thus, it is understood, that for example 2, the functionality provided by the break pin 132 is, by means of the locking arrangement 142;148, actively prevented from being used when the appropriate key is used in the lock. This implies that the break pin 132 does not react to a tangential force in example 2, but to an axial force. Other examples of the lock are however conceivable, where the break pin is configured to break upon a tangential force (i.e. a torque) exceeding a threshold tangential force.

It will be appreciated that many variants of the above-described embodiments are possible within the scope of the appended patent claims. For example, a linearly movable coupling member such as the coupling member 143 described for the lock geometry of example 2 may be equally well applicable for the lock geometry of example 1, realised for example by replacing the pivotable coupling member 43 in the lock 1. Likewise, a pivotable coupling member such as the pivotable coupling member 43 of example 1 may be equally well applicable for the lock geometry of example 2, realised for example by replacing the linearly movable coupling member 143 in the lock 2. As another example, the impulse dampening arrangement described with reference to example 2 may be equally well applicable for a lock geometry of example 1. This may be especially beneficial is a case where a linearly movable actuator is used in a lock geometry of example 1.

The invention claimed is:

1. Electromechanical lock assembly, which is configured to be powered upon insertion of a programmable key in a key receptacle, said lock assembly comprising a lock body, a lock core extending along an axial direction, the lock core being located at least partially within the lock body and selectively rotatable with respect to the lock body along the axial direction, the lock core including the key receptacle for receiving the programmable key, a lock bolt operating member rotationally secured to the lock core and configured to move a lock bolt of a lock for locking and unlocking said lock, and an electronic access control device, an annular element which is rotatably and axially displaceably mounted on said lock core, a coupling device arranged to communicate with said electronic access control device and, upon the insertion of an appropriate key in the key receptacle, rotationally lock the annular element to the lock core, thereby enabling rotation of the lock core and thereby enabling locking and unlocking of said electromechanical lock with said appropriate key, and a blocking arrangement comprising a retaining device arranged to prevent said annular element from rotating together with said lock core when the lock core is rotated with an inappropriate key, an engagement portion arranged to rotate with the lock core, one contact surface situated on the engagement portion, one contact surface situated on said annular element and a stationary blocking member, wherein said contact surfaces being configured to, upon rotation of said lock core relative to said annular element, axially move said annular element into engagement with said stationary blocking member, thereby blocking further rotation of the lock core and thereby preventing unauthorized locking and unlocking of said lock.

2. The electromechanical lock assembly according to claim 1, wherein the electromechanical lock assembly is configured to be powered by the programmable key when the programmable key has reached an activation position within the key receptacle.

3. Electromechanical lock assembly according to claim 1, wherein the coupling device comprises a coupling member arranged to be linearly movable along a direction being transverse to the axial direction of the lock core.

4. Electromechanical lock assembly according to claim 3, wherein said coupling member forms a part of an electric actuator of the coupling device, wherein said electric actuator is arranged to move the coupling member from a rest position, in which the coupling member allows the lock core to rotate relative to the annular element, to a coupling position in which the coupling member rotationally locks said annular element to said lock core.

5. Electromechanical lock assembly according to claim 4, wherein said annular element is movable between a non-blocking position, to which said annular element is biased by a biasing member, and a blocking position.

6. Electromechanical lock assembly according claim 4, wherein said coupling member comprises a locking portion arranged to be received in a geometrically complementary portion of the annular element.

7. Electromechanical lock assembly according to claim 4, wherein the coupling member further comprises a coupling member solenoid, and wherein the lock core further comprises a permanent magnet.

8. Electromechanical lock assembly according to claim 4, wherein the lock core further comprises an impulse dampening arrangement arranged to dampen a movement of the coupling member upon exposing the electromechanical lock assembly to an impulse.

9. Electromechanical lock assembly according to claim 8, wherein the impulse dampening arrangement comprises circuitry having an electromotive voltage generating function configured to generate an electromotive voltage in response to a voltage induced by a relative movement between the coupling member and the permanent magnet, thereby generating a magnetic force between the coupling member solenoid and the permanent magnet counteracting a movement of the coupling member relative to the lock core.

10. Electromechanical lock assembly according to claim 9, wherein said circuitry having an electromotive voltage generating function is defined by a closed loop including the coupling member solenoid and electrical connections short-circuiting the same.

11. Electromechanical lock assembly according to claim 8, wherein the impulse dampening arrangement further comprises a pivotable arm arranged to be pivoted relative to the lock core upon exposing the electromechanical lock to an impulse such that the pivotable arm upon the impulse blocks a movement of the coupling member relative to the lock core.

12. Electromechanical lock assembly according to claim 1, wherein said retaining device comprises a retaining member which is received in a recess formed in the annular element.

13. Electromechanical lock assembly according to claim 12, wherein said retaining member is a ball and preferably a spring biased ball.

14. Electromechanical lock assembly according to claim 12, wherein said recess is an axial groove extending in the axial direction.

15. Electromechanical lock assembly according to claim 1, wherein the lock assembly further comprises an axial movement limiting device arranged to limit axial movement of the annular element relative to the stationary blocking member, thereby preventing the annular element to be moved into engagement with the stationary blocking member.

16. Electromechanical lock assembly according to claim 15, wherein said axial movement limiting device comprises at least one ball received in an annular groove formed in the annular element.

17. Electromechanical lock assembly according to claim 1, wherein said lock body is cylindrical.

18. The electromechanical lock assembly according to claim 1, wherein the stationary blocking member is located in between a front face of the key receptacle and the annular element along the axial direction such that said contact surfaces are configured to, upon rotation of said lock core relative to said annular element, axially move said annular element in a direction towards the front face of the key receptacle into engagement with said stationary blocking member.

19. The electromechanical lock assembly according to claim 18, wherein said stationary blocking member is annularly shaped and arranged circumferentially around the lock core such that the lock core is freely rotatable in respect thereto.

20. The electromechanical lock assembly according to claim 18, further comprising a connecting element which is rotationally secured to the lock core and to the lock bolt operating member, and wherein said engagement portion forms a part of said connecting element.

21. The electromechanical lock assembly according to claim 20, wherein the connecting element is secured to the lock core by means of a break pin which is arranged to break upon a relative force applied between the lock core and the connecting element exceeding a threshold force.

22. The electromechanical lock assembly according to claim 21, wherein the connecting element is, further, rotationally secured to the lock core by means of a locking arrangement which is arranged to rotationally secure the lock core to the connecting element in an absence of an axial movement of said annular element into engagement with said stationary blocking member, and to rotationally unsecure the connecting element from the lock core upon a rotation of the lock core relative to the annular element when the annular element is in engagement with the stationary blocking member.

23. The electromechanical lock assembly according to claim 1, wherein the engagement portion forms a part of the lock core.

* * * * *